June 21, 1927.

C. B. WELLS 1,633,552

MACHINE FOR TRIMMING THE EDGES OF MOLDED DISKS

Filed April 12, 1926    5 Sheets-Sheet 1

Inventor
Cyrus B. Wells
By Robert Watson
Attorney

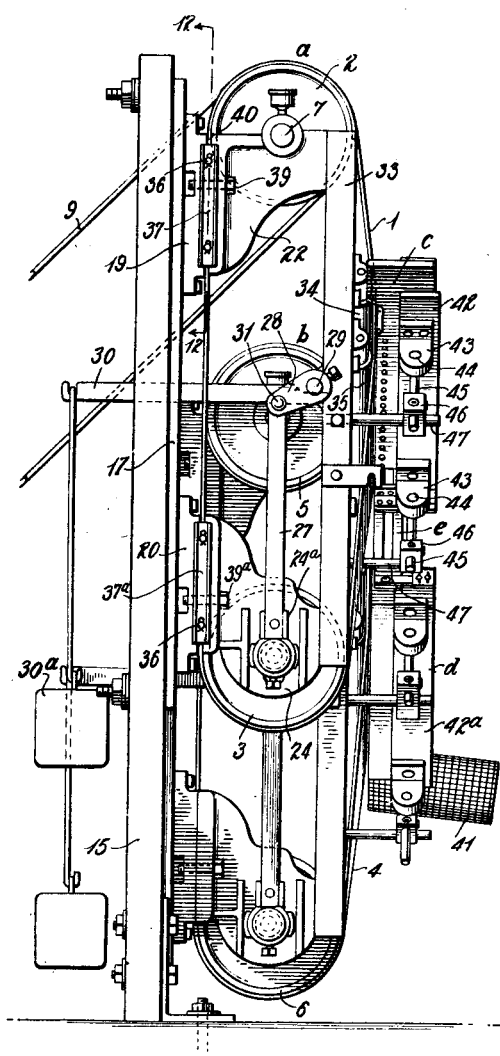

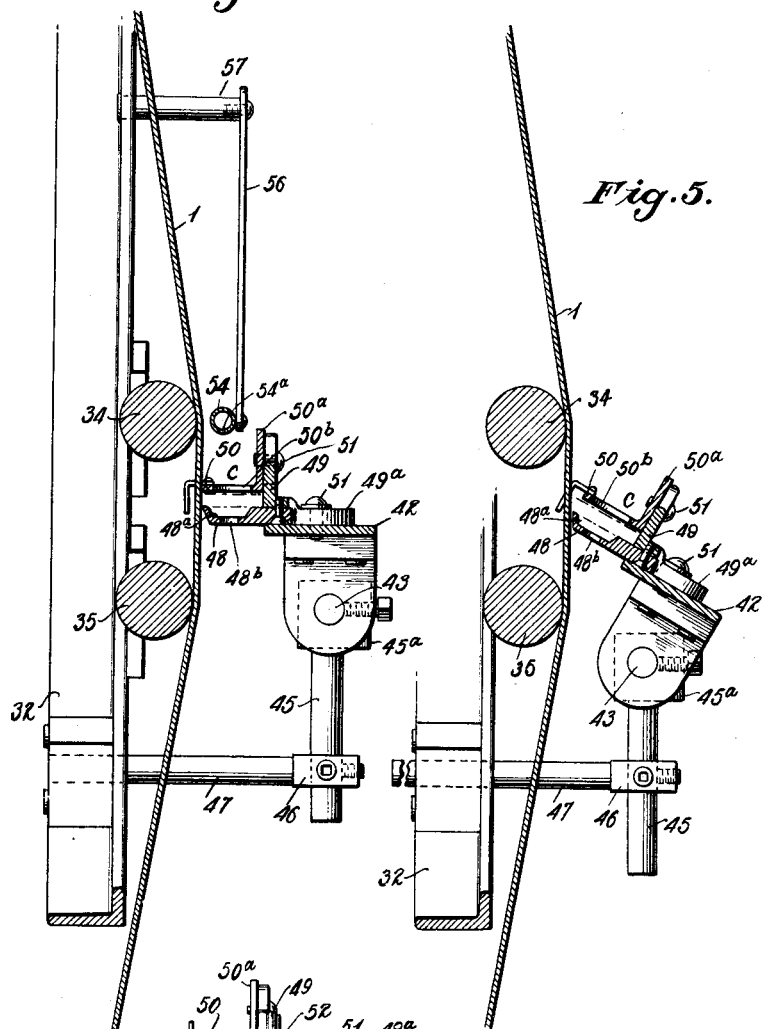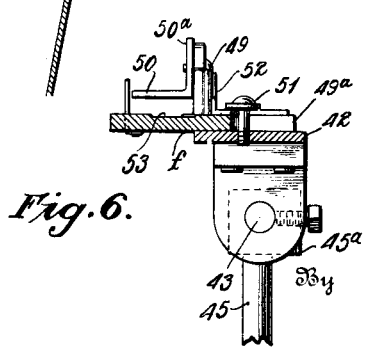

June 21, 1927.
C. B. WELLS
1,633,552
MACHINE FOR TRIMMING THE EDGES OF MOLDED DISKS
Filed April 12, 1925    5 Sheets-Sheet 4
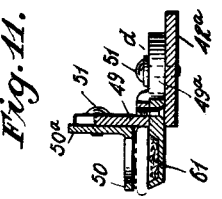
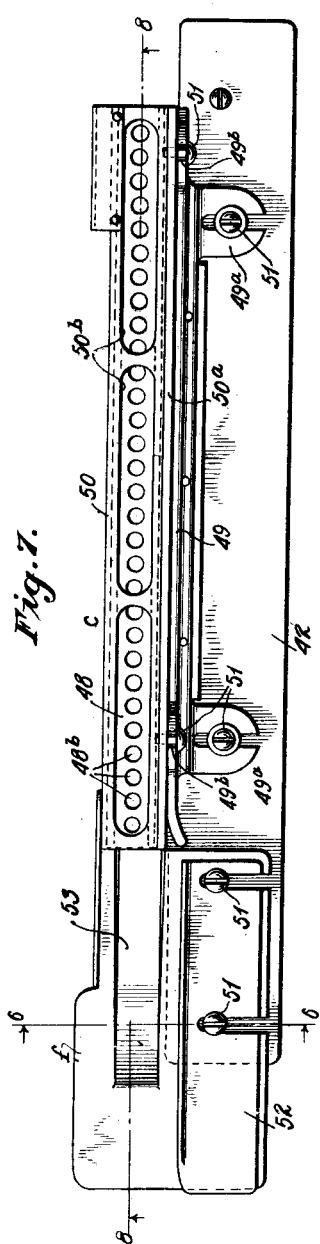
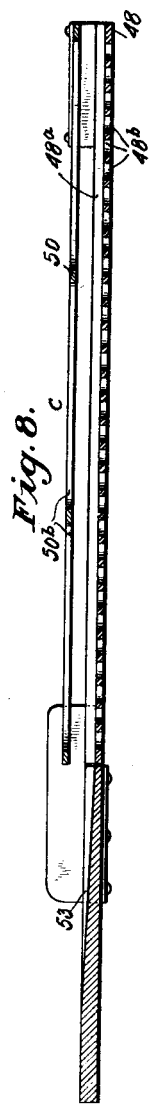
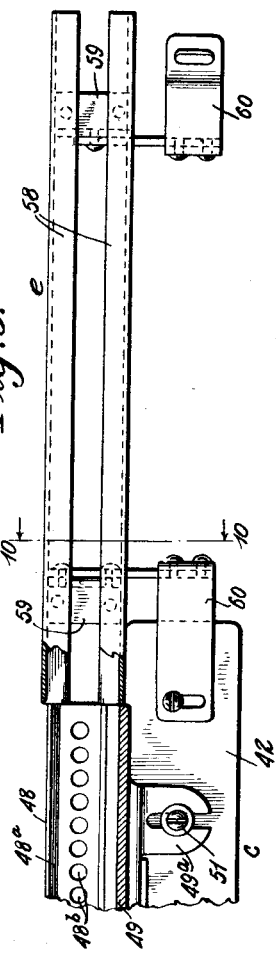
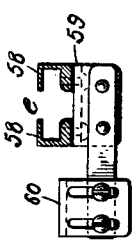
Inventor
Cyrus B. Wells
By Robert H. Watson
Attorney

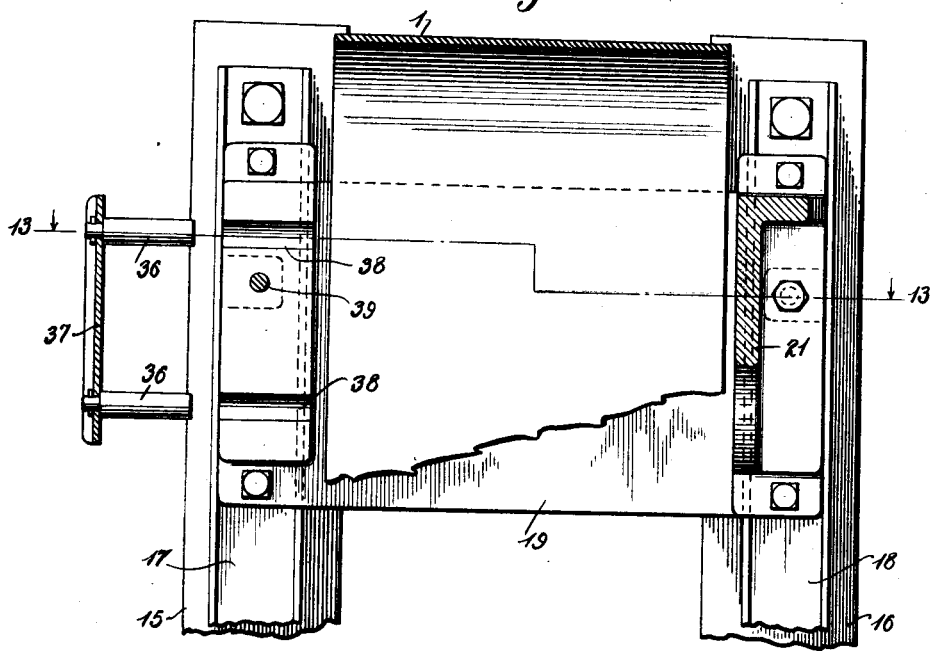
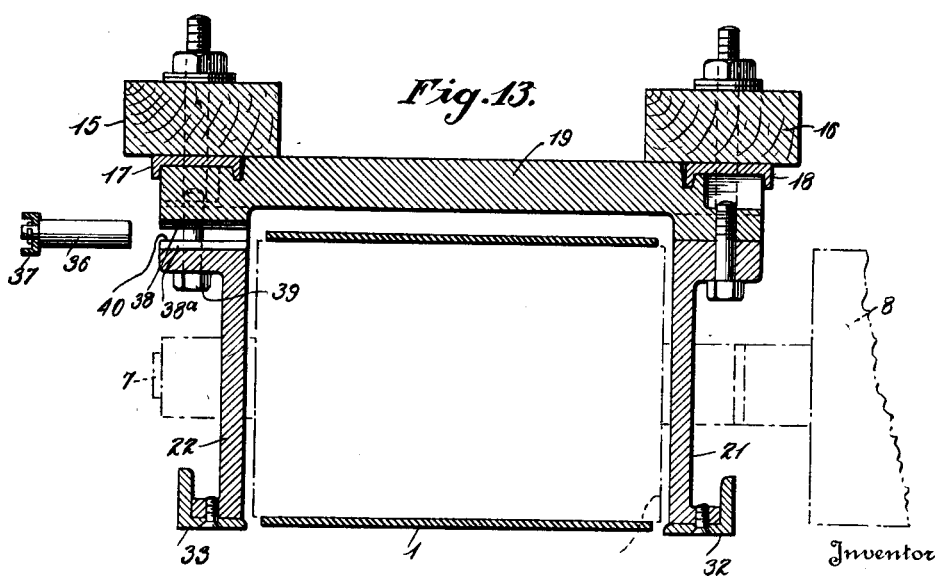

Patented June 21, 1927.

1,633,552

UNITED STATES PATENT OFFICE.

CYRUS B. WELLS, OF AUBURN, NEW YORK, ASSIGNOR TO THE SCRANTON BUTTON COMPANY, OF SCRANTON, PENNSYLVANIA, A CORPORATION OF PENNSYLVANIA.

MACHINE FOR TRIMMING THE EDGES OF MOLDED DISKS.

Application filed April 12, 1926. Serial No. 101,490.

This invention relates to machines for trimming the edges of buttons and other disklike objects which are made from plastic material. For convenience, the machine will be described as used in trimming buttons. In making the buttons in two-part molds, fins are left on the edges of the buttons along the meeting faces of the molds, and in order to finish the buttons their edges must be ground to remove the fins, and then polished. The purpose of the present invention is to provide a machine which will both grind and polish the edges of the buttons automatically.

In carrying out the invention, I provide, upon a suitable support, two endless belts having stretches which travel downwardly, substantially in the same plane, one of these belts having an abrasive surface and the other having a smooth polishing surface. Extending across the faces of these belts are downwardly inclined button guides, having open sides next the belts, so that the edges of the buttons may come in contact with the belts as the buttons travel through the guides. The guide opposite the abrasive belt is higher than the guide opposite the polishing belt, and a chute or bridge-piece connects these guides so that the buttons may travel continuously through the upper guide, thence through the connecting chute and thence through the lower guide. As the stretches of the belts opposite the guides travel downwardly they cause the buttons to travel toward the lower ends of the guides with a rolling motion against the front walls of the guides, and thus all parts of the circumferential edges of the buttons are brought in contact with the grinding and polishing belts.

In order to provide for the removal of the dust and fine particles of material ground from the edges of the buttons, the upper and lower walls of the upper guide are each provided with openings through which air may be blown, and an air pipe is arranged over the guide and provided with a series of openings through which a downward blast of air may be delivered into the guide. This air blast, besides blowing the ground material downwardly through the guide, materially assists in causing the buttons to travel downwardly in the guide. In the lower guide, wherein the edges of the buttons are polished, an air blast is delivered into the guide and this removes any particles of dust on the parts of the bodies exposed to the blast; but to remove the dust from the underside of the buttons, the lower wall of the guide is provided with a fabric lining, preferably felt, which effectively removes the dust. The buttons emerge from the lower guide free from dust and with their edges ground and polished.

The fins on some forms of buttons are midway between the faces of the buttons; on other forms the fins may be nearer to one face than to the other. Hence, in order to provide for removing fins from various kinds of buttons, I arrange the button guides so that they may be adjusted about their longitudinal axes to various positions, so that the edges of the buttons to be ground and polished may be presented to the belts at different angles. The guides are adjustable to suit buttons of different widths and thickness.

The grinding and polishing belts are relatively wide and are supported on drums on parallel shafts. As the weight carried by the shafts is considerable, I provide means for supporting the shafts at both ends. As the belts have to be renewed from time to time, I have provided means, hereinafter described, whereby the belts may be readily taken off or replaced without removing the bearings from the shafts.

In the accompanying drawing,

Fig. 2 is a left hand side elevation of the same;

Fig. 3 is a front elevation of the half of the machine shown at the left in Fig. 1, the belt being omitted;

Fig. 4 is a section on the line 4—4 of Fig. 1, the upper button guide being shown in horizontal position;

Fig. 5 is a similar view, showing said guide in inclined position;

Fig. 6 is a section through said guide on the line 6—6 of Fig. 7;

Fig. 7 is a top plan view of the upper button guide and its support;

Fig. 8 is a section on the line 8—8 of Fig. 7;

Fig. 9 is a top plan view, partly in section, of the bridge-piece which connects the button guides, a portion of one of the latter being shown;

Fig. 10 is a section on the line 10—10 of Fig. 9;

Fig. 11 is a section through the lower button guide taken on the line 11—11 of Fig. 1;

Fig. 12 is a section on the line 12—12 of Fig. 2; and,

Fig. 13 is a section on the line 13—13 of Fig. 12.

Figure 1:
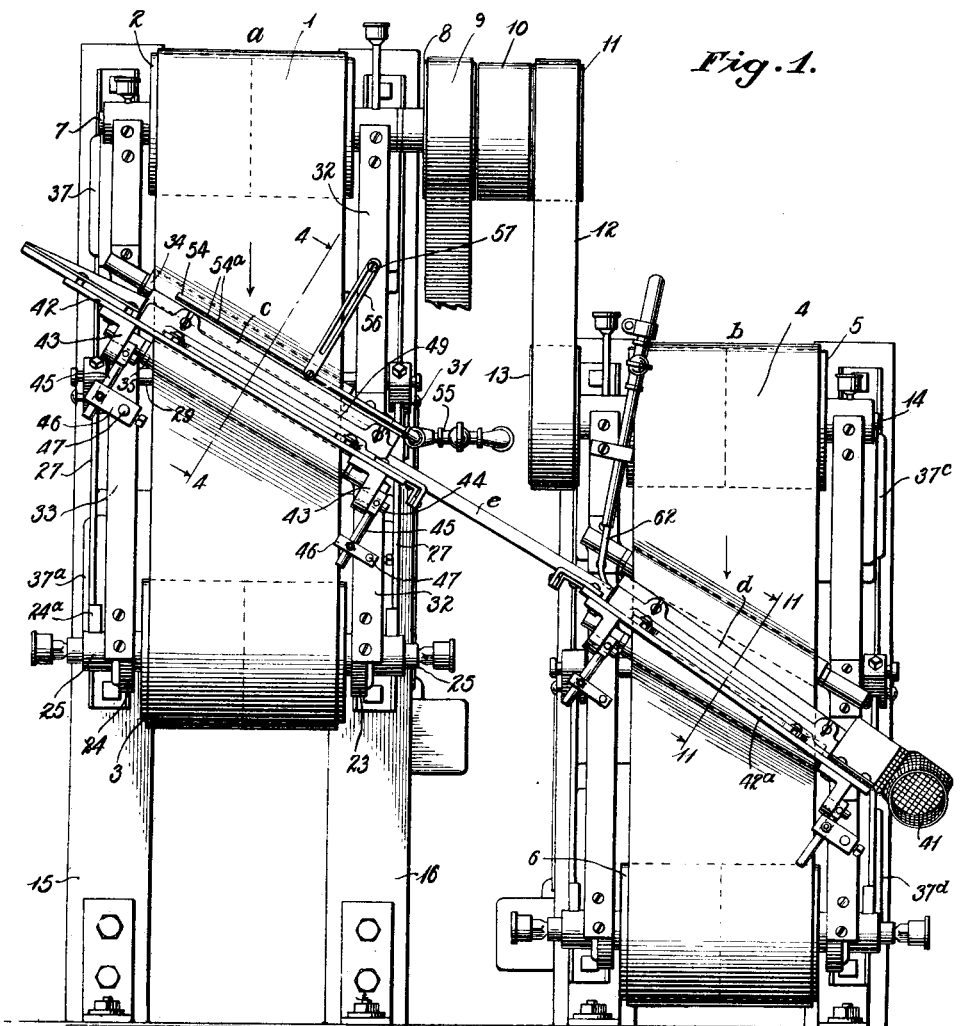
Fig. 1 is a front elevation of the machine.

The complete machine is composed of two sections, a and b, which are alike in most of their mechanical features. The section a carries an endless abrasive belt 1, mounted on rollers 2 and 3, and the section b carries a smooth oiled belt 4, mounted on rollers 5 and 6. The shaft 7 of the section a has an idle pulley 8 and a driving belt 9 extends around this pulley. Pulleys 10 and 11 are secured to the shaft 7, and the latter pulley is connected by a belt 12 to a pulley 13, secured to a shaft 14 on the section b. When the driving belt 9 is shifted on to the pulley 10, (by belt-shifting mechanism not shown) the shafts 7 and 14 of the two machine sections will be driven and the belts 1 and 4 will be driven at relatively high speeds. The forward stretches of the belts will have a downward motion, as indicated by the arrows in Fig. 1.

As the two sections of the machine are much alike, a description of the general features of section a will apply to section b, except where otherwise stated. The mechanism of section a is mounted upon uprights 15 and 16. On the faces of these uprights are channel bars 17 and 18, to which are secured metal cross-pieces 19 and 20. Brackets 21 and 22, (Figs. 1-3 and 13) having bearings for the shaft 7, are secured to the cross-piece 19, and brackets 23 and 24 are secured to the cross-piece 20. The roller 3 is mounted loosely upon a shaft 25 which is adjustable vertically in guide slots in the brackets, one of these slots being shown at 26 in Fig. 3. The shaft 25 is supported by links 27, which are pivotally connected to crank arms 28, secured to a rock shaft 29, extending transversely of the machine. A lever 30, resting upon a pivotal stud 31 at the end of one of the crank arms and bearing against the underside of the rock shaft 29, carries a weight 30ᵃ which serves, through the mechanism described, to press downwardly upon the shaft 25 carrying the lower roller 3. The function of the weight is thus to apply tension to the abrasive belt 1 and keep it taut.

An angle bar 32 is secured to the front edges of the brackets 21 and 23, and an angle bar 33 is secured to the front edges of the brackets 22 and 24. The rock shaft 29 is mounted in suitable bearings at the back of the angle bars, and rollers 34 and 35 are mounted in suitable bearings at the front of the angle bars. These rollers 34 and 35 are inclined downwardly, from left to right, as shown, and are parallel with one another and spaced a short distance apart. The belt 1 bears against these rollers, as shown in Figs. 2, 4 and 5.

It will be noted that the shafts which carry the upper and lower rollers 2 and 3 are supported at both ends. Because the abrasive belts have to be renewed at intervals, it is desirable to provide means whereby a belt can be removed from or placed upon the rollers without removing the bearings which support the shafts. For this purpose, the bracket 22, which supports the outer end of the shaft 7, is not secured directly to the cross-piece 19, but, as shown in Figs. 2, 12 and 13, this bracket is spaced from the cross-piece 19 by dowel pins 36, which are connected together by a metal part 37 and are adapted to fit into grooves 38, 38ᵃ, in the cross-piece and bracket, respectively. A bolt 39, passing through the flange of the bracket and into the cross-piece 19, clamps the bracket against the dowel pins, which latter space the bracket from the cross-piece and leave a gap 40 of sufficient width to permit the abrasive belt to pass through when the dowel pins and the bolt 39 are removed. The lower bracket 24 is connected in a similar way to the cross-piece 20, and spaced from it by dowel pins on a metal strip 37ᵃ. In order to change a belt, it is only necessary to remove the bolts 39 and 39ᵃ and the strips 37 and 37ᵃ, carrying the dowel pins, and the belts may then be passed through the gaps between the brackets and cross-pieces. Upon replacement of the dowel pins and tightening of the bolts, the brackets will be firmly secured to the cross-pieces. The dowel pins insure the correct positioning of the brackets to aline the bearings for the shafts.

On the polishing section b of the machine, the brackets on the side of the section opposite the driving pulley 13, that is, the right hand side in Fig. 1, are connected to the cross-pieces in the same manner as the brackets 22 and 24, at the left side of the section a are connected. Thus, by removing the dowel pins which are connected to strips 37ᶜ and 37ᵈ, in the section b, (Fig. 1) the polishing belt can be removed by passing it through the gaps between the brackets and the cross-pieces.

A button guide c is arranged in front of the abrasive belt of the section a, and a button guide d is arranged in front of the smooth belt on the section b, and these guides are connected by a bridge-piece e. The button guides and bridge-piece, as shown in Fig. 1, are inclined downwardly from left to right, so that buttons placed in the guide in the section a will travel successively through said guide, the bridge-piece and the guide d to an outlet spout 41, composed of woven wire. These guides are arranged in front of those portions of the belts which are between the pairs of inclined rollers over which the belts travel.

The structure of the guide c, which is arranged upon the section a of the machine, is illustrated in Figs. 4–8, inclusive. The guide is detachably secured to a flat metal bar 42, which is adjustably mounted in front of the abrasive belt. As shown in Figs. 1, 2, 4 and 5, the bar 42 has a pair of lugs 43, secured to its underside near its ends, and these lugs have pins 44 which project laterally, parallel with the bar into openings in the heads 45ª on studs 45. The studs 45 extend through openings in arms 46, which are mounted on the outer ends of studs 47, secured to the angle irons 32 and 33, respectively. Set screws are provided for locking the arms 46 to the studs 47; also for locking the studs 45 to the arms 46 and for locking the pins 44 to the heads 45ª. The arrangement of these parts is such that the button guide may have a more or less universal adjustment. Thus, by adjusting the arms 46 on the studs 47, the button guide and its supporting bar may be set inwardly or outwardly with respect to the belt; by adjusting the studs 45 in the arms 46, the guide may be raised or lowered, and by adjusting the pins 44 in the heads 45ª, the button guide and its supporting bar may be set at various angles with respect to the belt, as illustrated in Figs. 4 and 5.

The button guide c is in the form of a trough, open at one side, and comprises a bottom plate 48, a back piece 49 and a top plate 50. The bottom plate is secured to the back plate 49, and the latter has lugs 49ª which rest upon the supporting bar 42. These lugs are slotted, as shown in Fig. 7, and clamping screws 51 extend through the slots in the lugs and secure them to the supporting bar. The lower plate 48 of the button guide is longitudinally channeled, as indicated at 48ª, and the channeled portion has a series of perforations 48ᵇ extending throughout its length. The upper plate 50 of the guide is one flange of an angle bar, the other flange 50ª being secured against the back piece 49. As shown, the back piece 49 has vertical slots 49ᵇ and clamping screws 51 extend through these slots and into the flange 50ª. The upper plate 50 of the button guide is thus adjustable with respect to the lower plate 48 to vary the depth of the channel between these plates. The upper plate 50 is cut away, as shown at 50ᵇ, to permit air to be blown into and through the button guide as hereinafter explained.

A channeled feed plate f is adjustably secured to the supporting bar 42 by clamping screws 51, and a flanged guide 52 is adjustably secured upon the feed plate by the same screws.

The buttons which are to be trimmed are placed on the feed plate by the operator over a channel 53 which meets the channel in the button guide, and when the buttons pass into the latter channel they roll against the back piece 49 and extend from the back piece to the abrasive belt, as indicated in dotted lines in Figs. 4 and 5. The front stretch of the belt moves downwardly, as indicated by the arrow in Fig. 1, and this downward movement of the belt causes the buttons to roll downwardly in the guide, and the fins or rough edges on the buttons are ground off as the buttons travel toward the lower end of the guide. In molding some forms of buttons, the fin left by the dies on the periphery of the button is central between the faces of the button; in molding other forms, the fin is left nearer to one face of the button than the other. Where the fin is central between the faces of the button, the button guide will be set as in Fig. 4, but where the fin is nearer to one face than to the other, the guide may be tilted, as shown in Fig. 5, so that the button will engage the belt at the proper angle to have the fin ground off flush with the edge of the button.

Above the button guide is arranged an air pipe 54, swiveled to a supply pipe 55 and provided on its under side with a plurality of slots 54ª, through which air may be blown into the button guide through the longitudinal slots 50ᵇ in said guide. The air blown downwardly into the guide blows the filings and dust downwardly through the guide, and these filings are carried off by a suction chute which, in practice, is arranged beneath the guide. This chute, for the sake of clearness, is not shown in the drawings. The downward blast of air from the pipe 54 also assists in carrying the buttons downwardly in the button guide. A link 56, connected to the pipe 54 and having a sliding frictional engagement with a stud 57 on the bar 32 of the machine, supports the pipe 54. The pipe may be swung upwardly away from the button guide and the link 56 will hold it in its upper position. This adjustability of the pipe is provided in order that the operator may have access to the buttons in the button guide through the openings 50ᵇ, in case the buttons should become jammed in the guide.

The buttons, after having their edges trimmed while passing through the guide c, in contact with the abrasive belt, pass by gravity through the bridge-piece or chute e to the button guide d, which is in front of the polishing belt 4. The bridge-piece e, as shown in Figs. 9 and 10, comprises two channel bars 58—58 arranged with their channels opposing one another. These channel bars are connected together and held parallel with one another by cross-pieces 59, and to these cross-pieces are secured arms 60 which are adjustably supported on the bars 42 and 42ª, which support the button guides on the sections a and b of the machine. The channel bars 58 are spaced a sufficient distance apart to permit the buttons to slide down freely through the bridge-piece to the lower button guide d.

The lower button guide d is the same in all respects as the button guide c, which has been described, except that, as shown in Fig. 11, a strip of felt 61 is arranged in the channel of the lower plate of the button guide. As the buttons travel down through the lower guide d, any dust from the lower faces of the buttons is taken off by the felt. An air blast delivered from a pipe 62 (Fig. 1) blows the dust from the surfaces and edges of the buttons and also assists in forcing the buttons downwardly in the lower guide. As the buttons travel through the lower guide they roll against the back piece 49 and against the oiled belt 4, which polishes the edges of the buttons and, by its downward movement, causes the buttons to roll toward the lower end of the guide d. After passing through the guide d, the finished buttons enter the sieve-like discharge chute 41 and from that pass into a suitable receptacle, not shown. When the buttons enter the receptacle they are trimmed and polished on their edges and free from dust and filings.

While I have described the machine as used for trimming and polishing the edges of buttons, it will be understood that the machine may be used for trimming and polishing the edges of various circular objects, and is, in fact, used for trimming and polishing the edges of articles such as checkers, cork tops, ink well covers, etc., made of plastic material.

What I claim is:

1. In a machine for trimming the edges of molded disks, such as buttons, an endless abrasive belt having a stretch adapted to travel downwardly, means for driving the belt, and a disk guide extending across the face of said stretch and inclined downwardly toward the discharge end, said guide having parallel top and bottom walls adapted to hold the disks edgewise with respect to the belt, and having one side wall, the latter spaced from the belt by approximately the width of the disks which are to be trimmed and the side of the guide opposite said side wall being open to permit the disks to engage the belt.

2. In a machine for trimming the edges of molded disks, such as buttons, an endless abrasive belt having a stretch adapted to travel downwardly, means for driving the belt, a disk guide extending across the face of said stretch and inclined downwardly toward the discharge end, said guide having parallel top and bottom walls adapted to hold the disks edgewise with respect to the belt, and having one side wall, the latter spaced from the belt by approximately the width of the disks which are to be trimmed and the side of the guide opposite said side wall being open to permit the disks to engage the belt, the top and bottom of the guide having openings, and means for delivering a downward blast of air into said openings.

3. In a machine for trimming and polishing the edges of molded disks, such as buttons, an abrasive belt and a polishing belt each having a stretch adapted to travel downwardly, disk guides extending across the faces of said stretches and inclined downwardly toward their discharge ends, said guides having open sides to permit the edges of the disks to engage the belts, and side walls opposed to said open sides, for holding the disks against the belts, the guide opposite the abrasive belt being higher than the guide opposite the polishing belt, an inclined chute or bridge-piece, having parallel side walls, for conveying disks from the upper to the lower guide, and means for blowing air downwardly into said guides.

4. In a machine for trimming and polishing the edges of molded disks, such as buttons, an abrasive belt and a polishing belt each having a stretch adapted to travel downwardly, disk guides extending across the faces of the belts and inclined downwardly, said guides having open sides next the belts, the guide opposite the abrasive belt being higher than the guide opposite the polishing belt and having openings through its top and bottom walls and the guide opposite the polishing belt having a fabric lining on its lower wall, a bridge-piece connecting said guides, and means for blowing air into said guides.

5. In a machine of the class described, supporting means, upper and lower pairs of brackets secured thereto, dowel pins fitting between one bracket of each pair and its supporting means and spacing the bracket from said means, shafts mounted in said brackets, drums on said shafts, between the brackets, and an endless belt extending around said drums.

6. In a machine of the class described, supporting means, upper and lower pairs of brackets secured thereto, two dowel pins fitting between one bracket of each pair and its supporting means and spacing the bracket from said means, a metal strip to which said pins are secured, shafts mounted in said brackets, drums on said shafts, between the brackets, and an endless belt extending around said drums.

In testimony whereof I hereunto affix my signature.

CYRUS B. WELLS.